(12) United States Patent
Krus et al.

(10) Patent No.: US 11,723,491 B2
(45) Date of Patent: Aug. 15, 2023

(54) SALAD SPINNER

(71) Applicant: Lifetime Brands, Inc., Garden City, NY (US)

(72) Inventors: Matthew Krus, Seattle, WA (US); Ian Morgan, Seattle, WA (US); Sami Piercy, Seattle, WA (US)

(73) Assignee: LIFETIME BRANDS, INC., Garden City, NY (US)

( * ) Notice: Subject to any disclaimer, the term of this patent is extended or adjusted under 35 U.S.C. 154(b) by 168 days.

(21) Appl. No.: 17/400,737

(22) Filed: Aug. 12, 2021

(65) Prior Publication Data

US 2023/0047222 A1 Feb. 16, 2023

(51) Int. Cl.
*A47J 43/24* (2006.01)
*B26D 1/28* (2006.01)
*B26D 3/26* (2006.01)
*B26D 5/10* (2006.01)

(52) U.S. Cl.
CPC ............. *A47J 43/24* (2013.01); *B26D 1/28* (2013.01); *B26D 3/26* (2013.01); *B26D 5/10* (2013.01); *B26D 2210/02* (2013.01)

(58) Field of Classification Search
CPC . A47J 43/24; A47J 43/04; A47J 43/06; B02C 18/00; B02C 18/06
USPC .......................................................... 99/509
See application file for complete search history.

(56) References Cited

U.S. PATENT DOCUMENTS

| | | | | |
|---|---|---|---|---|
| 4,007,751 A | * | 2/1977 | Commiant | A47J 43/24 |
| | | | | 134/143 |
| 5,562,025 A | * | 10/1996 | Bull | A47J 43/24 |
| | | | | 494/60 |
| 5,865,109 A | * | 2/1999 | Bull | A47J 43/24 |
| | | | | 494/60 |
| 6,018,883 A | * | 2/2000 | Mulhauser | F26B 5/08 |
| | | | | 494/60 |
| 6,622,618 B1 | * | 9/2003 | Glucksman | A47J 43/24 |
| | | | | 494/60 |
| 7,264,189 B2 | * | 9/2007 | Holcomb | A47J 43/105 |
| | | | | 241/101.1 |

(Continued)

FOREIGN PATENT DOCUMENTS

| | | |
|---|---|---|
| AU | 2014313888 A1 | 3/2016 |
| GB | 1481285 A | 7/1977 |
| WO | 2005115209 A1 | 12/2005 |

OTHER PUBLICATIONS

European Search Report from European Application No. EP22189922.2 dated Dec. 19, 2022, 12 pgs.

*Primary Examiner* — Sean M Michalski
(74) *Attorney, Agent, or Firm* — Tutunjian & Bitetto, P.C.

(57) ABSTRACT

A salad spinner includes a lid having a pull ring supported thereon and a strainer bowl having a strainer basket supported therein, the strainer basket having a pivotable strainer handle mounted on a chopper. The pull ring is configured to be angularly displaced away from the lid to impart a spinning motion to the strainer basket within the strainer bowl. The strainer handle defines a centrally disposed strainer aperture. The lid has a hex shaft that is removably coupled to the strainer aperture of the strainer handle. The hex drive shaft is further removably coupled to a hex opening of a chopper rod of a chopper. The hex drive shaft initiates the spinning motion to chop salad and to dry salad independently of each other.

18 Claims, 7 Drawing Sheets

(56) References Cited

U.S. PATENT DOCUMENTS

| | | | | |
|---|---|---|---|---|
| 7,905,438 B2* | 3/2011 | Holcomb | ............... | A47J 43/07 |
| | | | | 241/292.1 |
| 9,756,983 B2 | 9/2017 | Myoung | | |
| D829,062 S | 9/2018 | O'Leary et al. | | |
| 10,631,687 B2* | 4/2020 | Hagger | ................... | A47J 43/24 |
| 2005/0204935 A1* | 9/2005 | Siegel | .................... | A47J 43/24 |
| | | | | 99/495 |
| 2006/0037211 A1 | 2/2006 | Herren | | |
| 2006/0144257 A1* | 7/2006 | Cheng | .................... | A47J 43/24 |
| | | | | 99/511 |
| 2007/0137504 A1* | 6/2007 | Wan | ........................ | A47J 43/24 |
| | | | | 99/495 |
| 2007/0256315 A1* | 11/2007 | Wong | ..................... | A47J 43/24 |
| | | | | 34/58 |
| 2008/0210103 A1* | 9/2008 | Wan | ......................... | F26B 5/08 |
| | | | | 34/58 |
| 2010/0263555 A1* | 10/2010 | Mah | ........................ | A47J 43/24 |
| | | | | 99/495 |
| 2012/0260957 A1* | 10/2012 | Lee | ......................... | A47J 43/24 |
| | | | | 134/56 R |
| 2014/0283692 A1* | 9/2014 | So | ........................... | A47J 43/24 |
| | | | | 99/495 |
| 2016/0045072 A1* | 2/2016 | Myoung | ................ | A47J 43/24 |
| | | | | 99/495 |
| 2016/0095474 A1* | 4/2016 | Hauser | ................... | A47J 43/24 |
| | | | | 99/495 |
| 2019/0350246 A1* | 11/2019 | Greene | .................. | A47J 43/24 |

* cited by examiner

SALAD SPINNER

BACKGROUND

The present invention relates generally to kitchen utensils, and more specifically, to a salad spinner.

Salad spinners are appliances useful in food preparation, particularly in cleaning certain fruits and vegetables. Typically, an individual washes such foods by immersion in a water bath or by directing a stream of water onto the food from a faucet. In many situations, it is desirable to dry these washed foods. Salad spinners provide such a drying function by centrifuge action. That is, salad spinners spin the food in a basket about an axis with the result that water on the food displaces to a surrounding bowl. A typical construction of a salad spinner includes a housing having a lid, a basket supported in the housing for rotation, and a drive mechanism for rotating the basket to spin off water from salad in the basket.

However, conventional salad spinners have certain drawbacks. Some are difficult to operate. Others are difficult to clean. Still others require extended times for completing a spinning operation.

SUMMARY

In accordance with an embodiment, a salad spinner is provided. The salad spinner includes a lid having a pull ring supported thereon and a hex drive shaft extending centrally from a bottom portion thereof and a strainer bowl having a strainer basket supported therein, the strainer basket having a pivotable strainer handle mounted on a chopper, wherein the pull ring is configured to be angularly displaced away from the lid to impart a spinning motion to the strainer basket within the strainer bowl, the spinning motion initiated by the hex drive shaft.

In accordance with another embodiment, a salad spinner is provided. The salad spinner includes a lid having a hex drive shaft removably coupled to a hex opening of a chopper and a strainer bowl having a strainer basket placed therein, the strainer basket having a pivotable strainer handle extending a diameter of the strainer basket.

In accordance with yet another embodiment, a salad spinner is provided. The salad spinner includes a lid having a hex drive shaft extending centrally from a bottom portion thereof and a strainer bowl having a strainer basket supported therein, the strainer basket having a foldable strainer handle extending a length of the strainer basket, wherein spinning motion of the strainer basket is initiated by the hex drive shaft.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
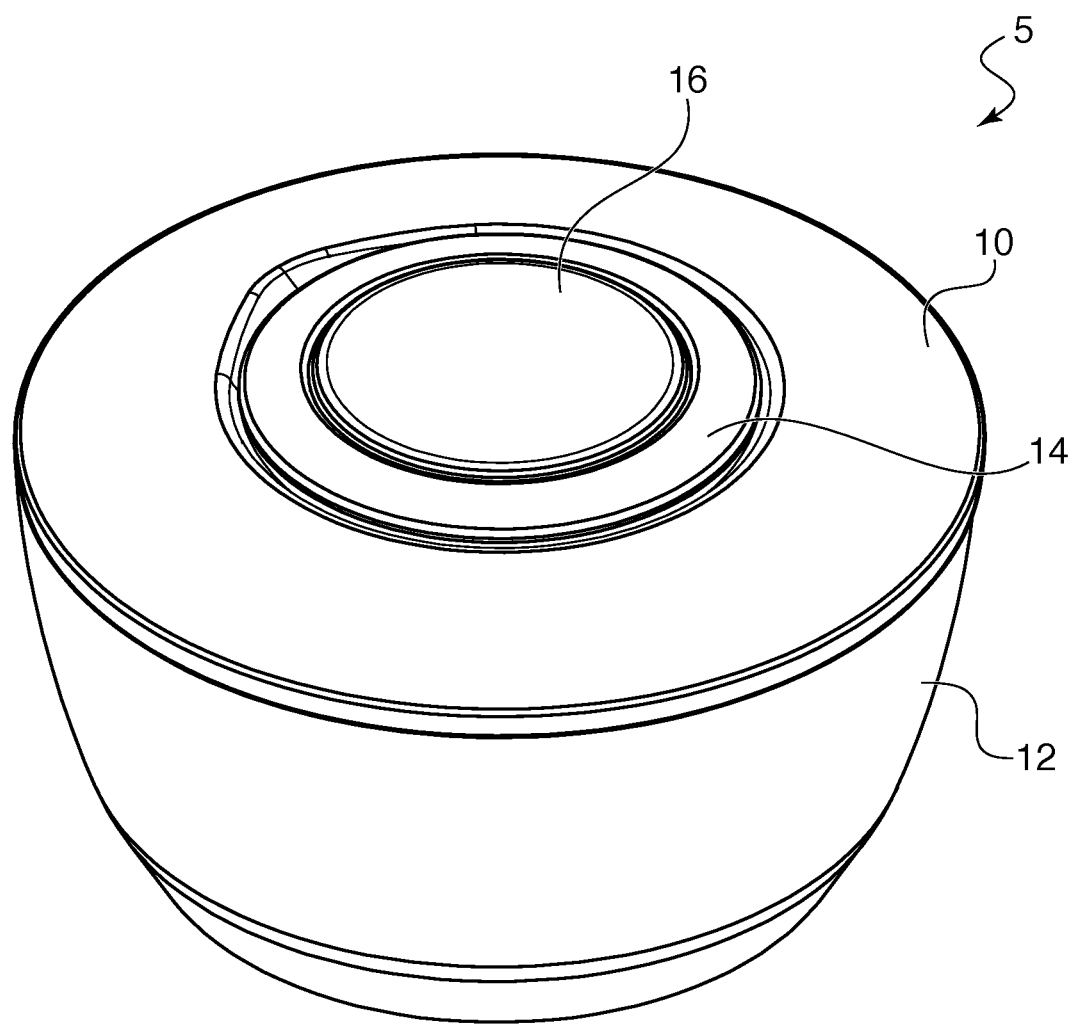
FIG. 1 illustrates a perspective view of a salad spinner, in accordance with an embodiment of the present invention.

Embodiments in accordance with the present invention provide for a salad spinner as a combination food chopper and food spinner. A pull ring cooperates with the lid of the salad spinner. The pull ring is pulled with an angular displacement to trigger rotation of the contents within the strainer bowl by rotating the strainer basket. The pull ring can also be triggered to chop the contents within the strainer basket independently of drying the contents within the strainer basket.

Conventional salad spinners usually include an outer bowl with solid walls and an inner perforated bowl adapted to nest within the outer bowl. Salad ingredients are located in the inner bowl and a cover is provided for covering the salad. A drive means can be provided for spinning the inner bowl relative to the outer bowl whereby water on the lettuce and/or other vegetables can be passed through the perforated wall and collected in the outer bowl. A handle for operating the drive means is often associated with a lid placed over the bowls.

Salad spinners are commonly used to dry salad leaves, herbs, or other similar food items. A typical salad spinner generally includes an external bowl supporting an internal basket. The basket is supported in a manner which it can spin within the bowl, thereby propelling items within the basket toward the perimeter of the basket. Water attached to lettuce leaves is likewise flung to the perimeter where it is expelled through holes in the basket while being retained within the bowl. Consequently, the leaves or other items within the bowl are dried.

One issue with salad spinners is that it is awkward and sometimes difficult to drain the water from the device. Salad spinners are often large, and the entire device must be partially disassembled in order to remove the lid and tip the spinner for draining. If the lid is removed, the user must then use his/her hands or some other tool to keep the salad within the basket when tipping it for draining, or must also remove the basket in order to allow it to drain. The configuration of existing salad spinners also makes it difficult to use the salad spinner as a vehicle to further rinse the salad, and instead it must be rinsed with the salad outside the bowl and then placed in the bowl to dry.

To alleviate the aforementioned issues, the exemplary embodiments of the present invention introduce a dual-action, hand-operated salad spinner that can dry the salad, as well as chop the salad independently of each other. A pull ring mounted on the lid and angularly displaced with respect to the lid initiates the spinning motion of the chopper, as well as the spinning motion of the strainer basket in the strainer bowl. The spinning motion is initiated from a center drive hex nut or hex drive shaft associated with the lid.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 illustrates a perspective view of a salad spinner, in accordance with an embodiment of the present invention.

The salad spinner 5 includes a lid 10 positioned on a strainer bowl 12. The strainer bowl 12 can have a round or circular shape to accommodate the lid 10 thereon. The strainer bowl 12 can be a translucent or transparent or opaque bowl. The lid 10 supports a ring 14 mounted thereon. The ring 14 extends around a central region 16 of the lid 10. In particular, the ring 14 is positioned or arranged or disposed within a circumferential recess 19 (FIG. 3) formed on a top surface of the lid 10. The circumferential recess 19 can also be referred to as a groove or a circumferential groove or trench or depression. The ring 14 can be referred to as an actuating element or actuator 14. The ring 14 can also be referred to as a pull ring.

The salad spinner 5 is a hand-operated salad spinner. In other words, there is no motor to actuate the spinning motion. Instead, the ring 14 imparts the spinning motion, where the ring 14 is actuated by hand operation (i.e., pulling of the ring 14 or angular displacement of the ring 14 ith respect to the lid 10). Stated differently, rotational motion can be accomplished by angular displacement or pulling of the pull ring 14.

Figure 2:
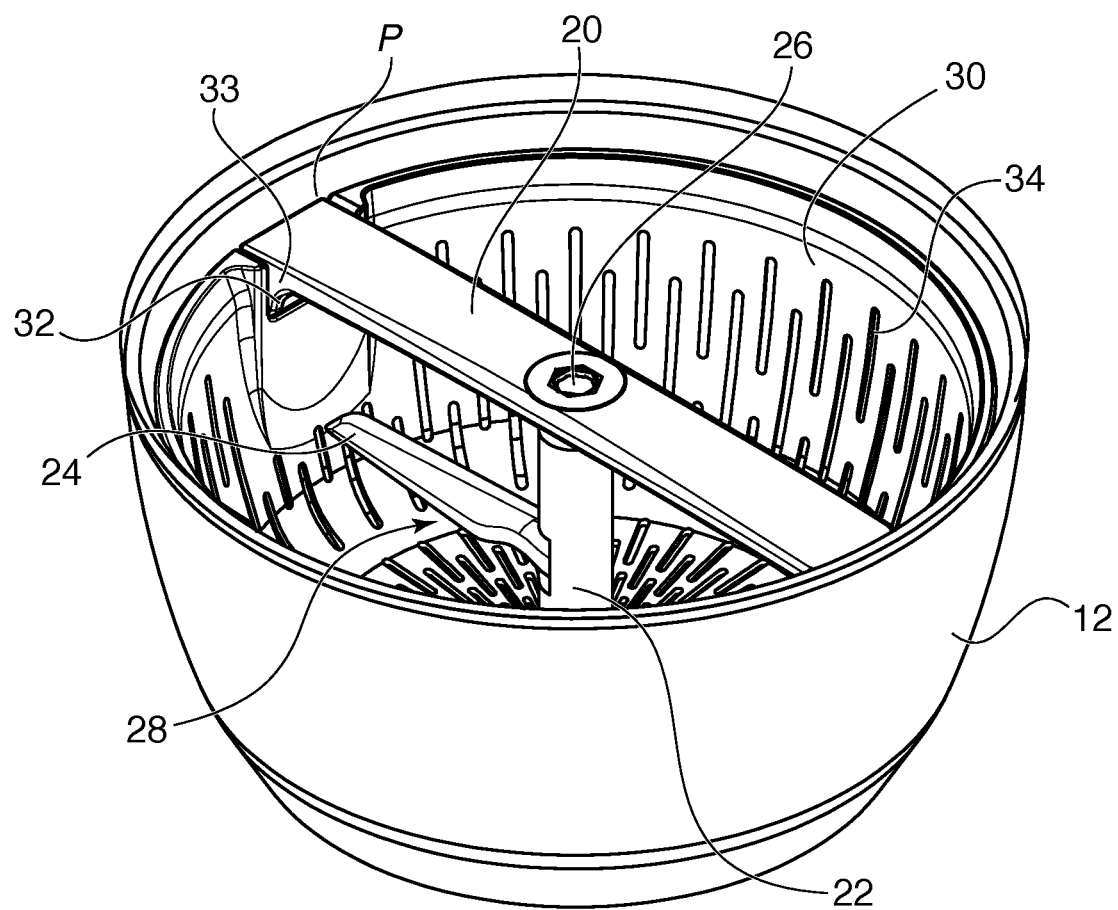
FIG. 2 illustrates a perspective view of the strainer handle and chopper blades of the salad spinner after the lid has been disengaged from the strainer bowl, in accordance with an embodiment of the present invention.

FIG. 2 illustrates a perspective view of the strainer handle and chopper blades of the salad spinner after the lid has been disengaged from the strainer bowl, in accordance with an embodiment of the present invention.

The strainer bowl 12 includes a strainer basket 30 supported therein. The strainer basket 30 circumferentially defines a plurality of slits 34. Each of the plurality of slits 34 can have an elongated or longitudinal shape. The strainer basket 30 can also be referred to as a perforated basket. A chopper 28 can be centrally placed within the strainer basket 30. The chopper 28 has a chopper rod 22 with a set of blades 24 extending therefrom. The chopper 28 can also be referred to as a chopper element or chopper component or chopper system. The proximal end 27 (FIG. 5) of the chopper rod 22 includes a hex opening 26. The hex opening 26 is configured to receive a hex drive shaft 92 (FIG. 6) centrally formed underneath the lid 10.

Figure 5:
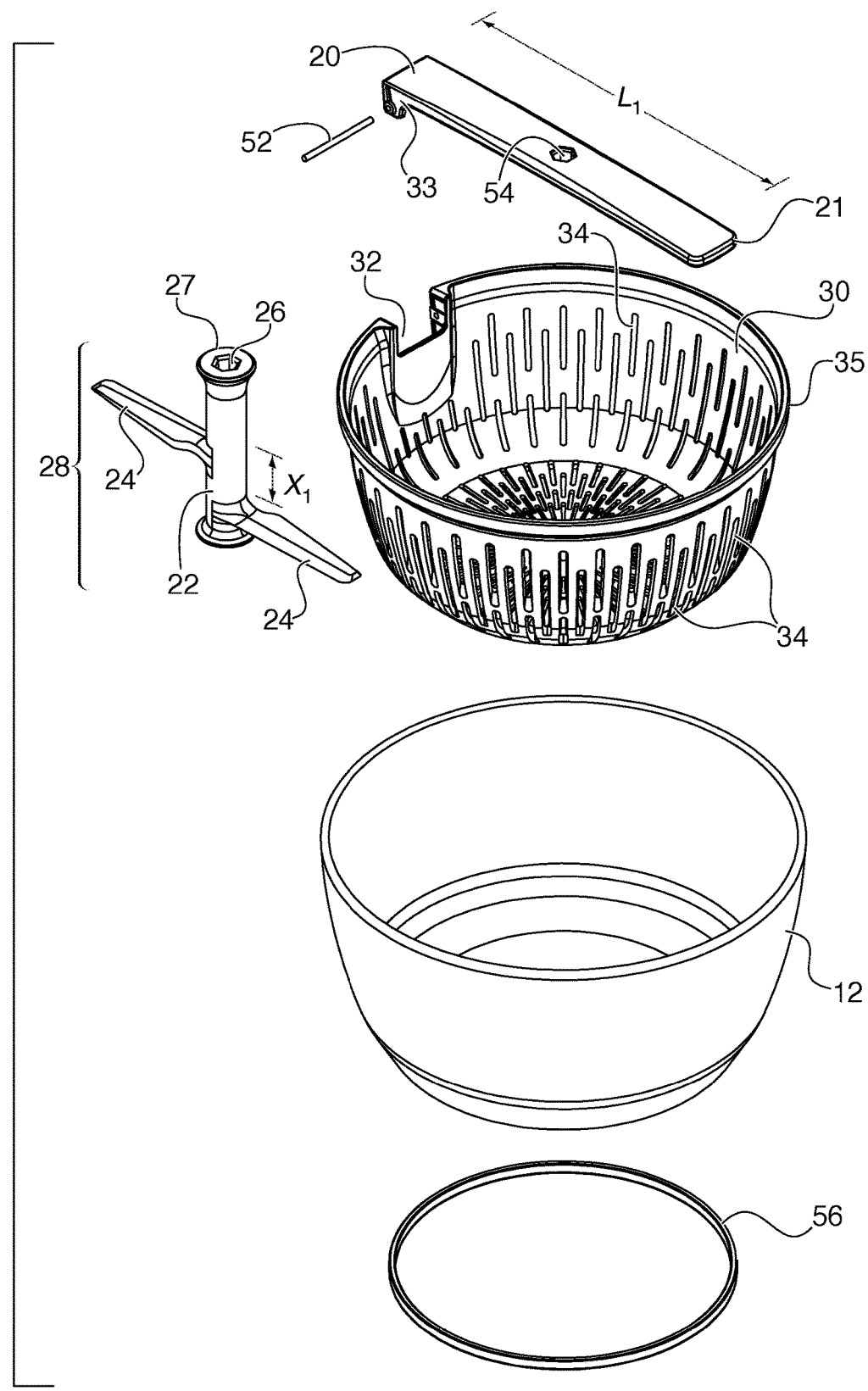
FIG. 5 illustrates an exploded perspective view of the strainer bowl of the salad spinner, in accordance with an embodiment of the present invention.

The strainer basket 30 further includes a strainer handle 20 therein. The strainer handle 20 is in a folded configuration such that the strainer handle 20 extends across a diameter of the strainer basket 30. The strainer handle 20 can also be referred to as a folding or folded handle. The strainer handle 20 defines a strainer aperture 54 (FIG. 5). The strainer aperture 54 has a hex shape. The hex shape of the strainer aperture 54 allows for the hex drive shaft 92 (FIG. 6) to be received therein.

The strainer handle 20, in a closed configuration, remains parallel, in its entirety, to the lid 10 and the bottom surface of the strainer bowl 12. The strainer handle 20 is positioned or placed within the strainer bowl 12. In fact, the strainer handle 20, in a closed configuration, extends horizontally to the outer periphery 35 of the strainer basket 30. The strainer handle 20 extends an entire length (or diameter) of the strainer basket 30.

The strainer handle 20 is fixedly attached or fixedly coupled to the strainer basket 30 at recess 32 via an extending clip portion 33 (or tab or flap 33). The strainer handle 20 pivots about point "P." The pivoting motion "C" at point "P" is further illustrated with reference to FIGS. 7 and 8.

Therefore, the salad spinner 5 is a dual-action or dual-function, hand-operated salad spinner. The salad spinner 5 can be used as a chopper to chop or slice or cut contents within the strainer basket 30 and the salad spinner 5 can be used to spin or rotate the strainer basket 30 to dry contents within the strainer basket 30. These two actions or functions are independent of each other. In other words, the user can either actuate rotation of the strainer basket 30 or the user can chop the contents within the strainer basket 30. Thus, the two distinct functions are independently actuated by the user.

Figure 3:
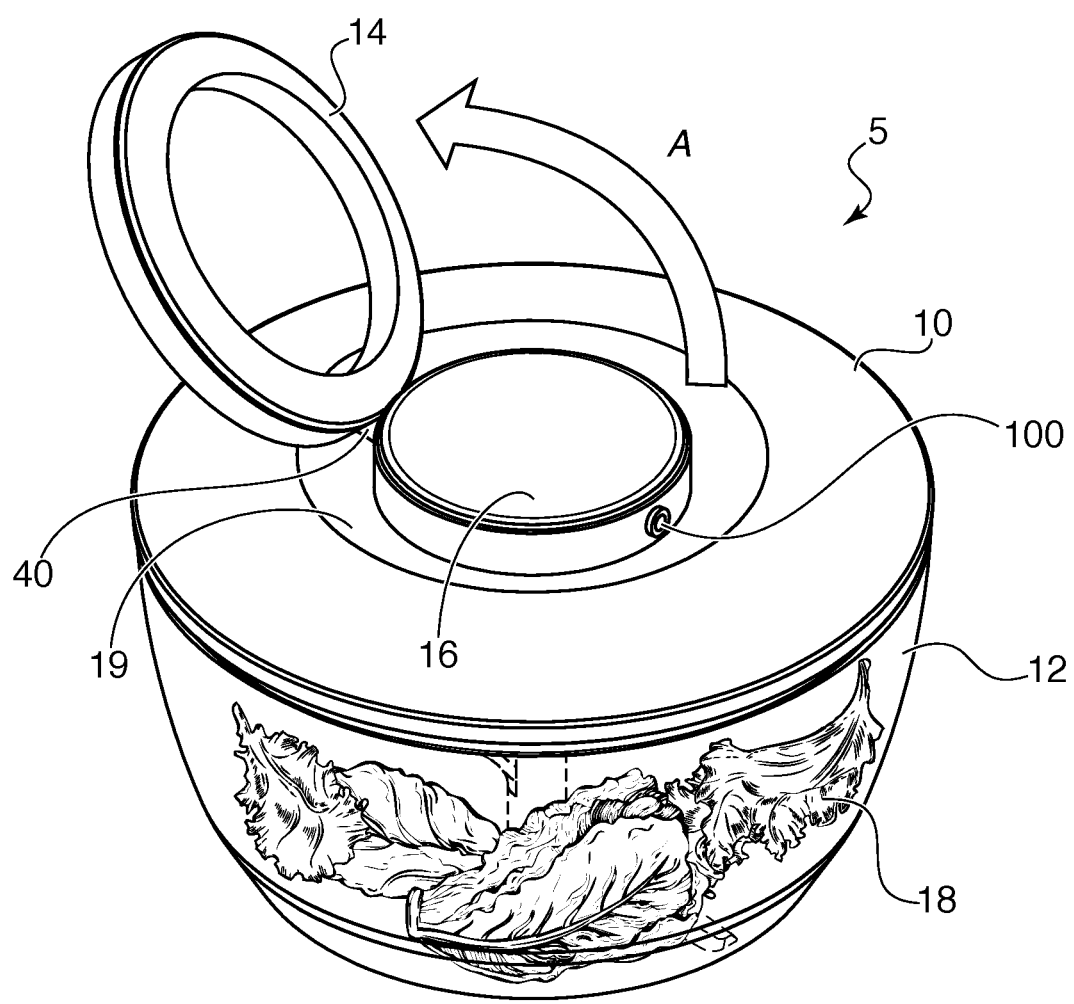
FIG. 3 illustrates a perspective side view of the salad spinner where the ring is flipped open, in accordance with an embodiment of the present invention.

FIG. 3 illustrates a perspective side view of the salad spinner where the ring is flipped open, in accordance with an embodiment of the present invention.

The ring 14 is flipped open in direction "A." The flipping of the ring 14 exposes the circumferential recess 19 formed on the lid 10. The flipping of the ring 14 also further defines the central region 16 of the lid 10. Salad content 18 is shown in the strainer bowl 12. In a flipped configuration, the ring 14 remains at an angle with respect to the lid 10. Thus, the ring 14 can rest in an angular or oblique or inclined position with respect to the lid 10 before the ring 14 is actuated.

A brake button 100 is also exposed by the flipping of the ring 14 in direction "A." The brake button 100 will be further described below with reference to FIG. 6.

Figure 4:
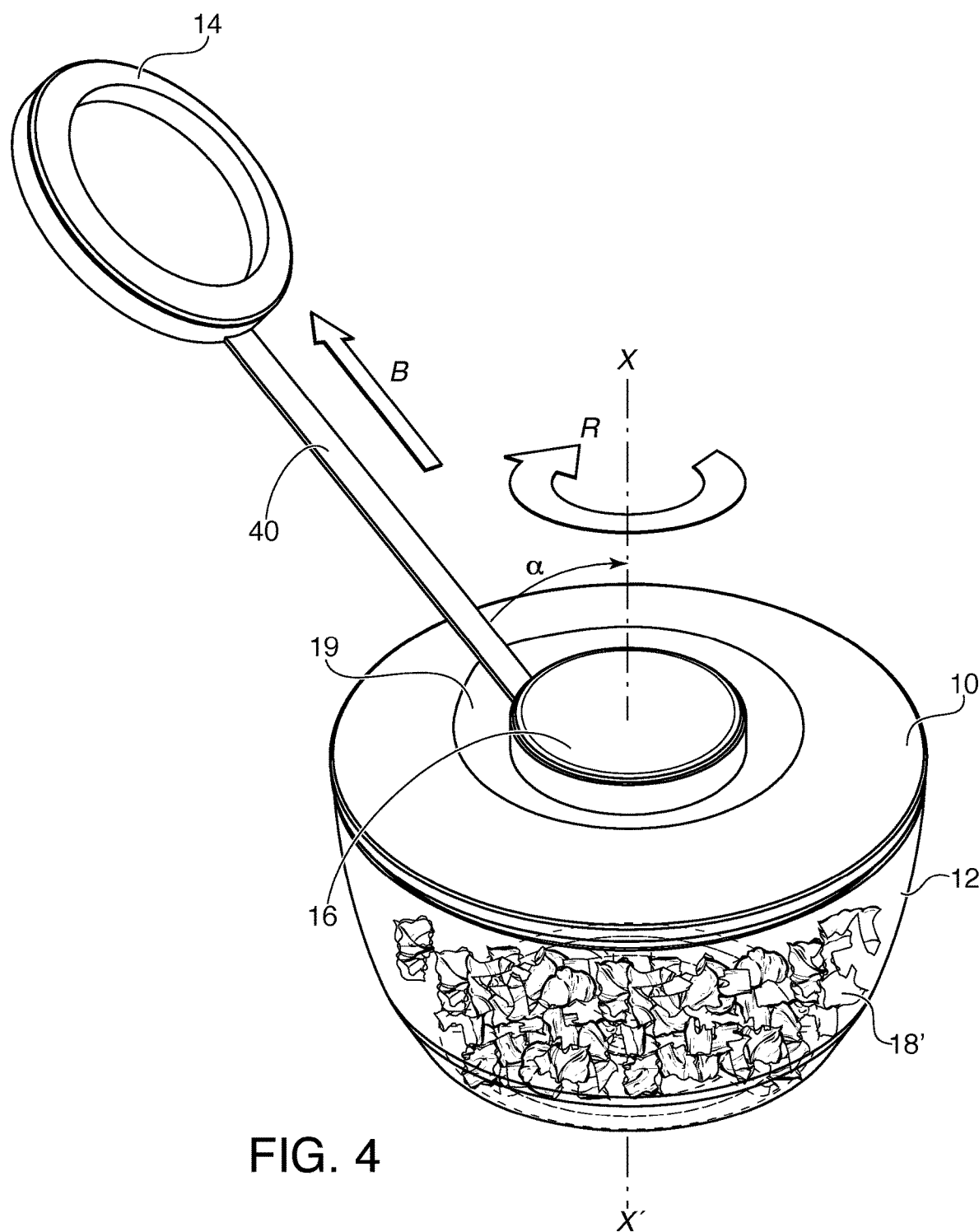
FIG. 4 illustrates a perspective side view of the salad spinner where the ring is pulled away from the lid to trigger rotation of the salad within the strainer bowl, in accordance with an embodiment of the present invention.

FIG. 4 illustrates a perspective side view of the salad spinner where the ring is pulled away from the lid to trigger rotation of the salad within the strainer bowl, in accordance with an embodiment of the present invention.

The ring 14 is pulled in a direction "B." The pulling of the ring 14 in direction "B" triggers rotation "R" of the salad content 18 such that the salad content is in a spinning state 18'. The pulling of the ring 14 exposes the lever arm 40 attached to the ring 14. The lever arm 40 is concealed within the interior of the central region 16 of the lid 10. The ring 14 in cooperation with the lever arm 40 is configured to impart a spinning motion to the strainer basket 30. The spinning motion is initiated from the center drive hex nut or hex drive shaft 92 (FIG. 6) associated with the lid 10.

One pull of the ring 14 can result in multiple rotations of the strainer basket 30 within the strainer bowl 12. The ring 14 can be pulled once or several times depending on the desired dryness of the salad content 18 to be achieved. The ring 14 can be pulled at an angle α with respect to axis x-x'. Axis x-x' extends vertically or perpendicular to the lid 10 and the strainer bowl 12. Thus, an angular outward extension of the ring 14 can trigger rotation "R" of the strainer basket 30 within the strainer bowl 12. Stated differently, angular displacement of the ring 14 causes or triggers a spinning motion or rotating motion of either the chopper 28 or the strainer basket 30.

FIG. 5 illustrates an exploded perspective view of the strainer bowl of the salad spinner, in accordance with an embodiment of the present invention.

The exploded view of the strainer bowl 12 illustrates the components within the strainer bowl 12. The strainer basket 30 defines the recess 32 and the plurality of slits 34. The strainer basket 30 is positioned or supported within the strainer bowl 12. The strainer bowl 12 can also include a bowl foot 56. The bowl foot 56 can be an O-ring positioned or placed at the base of the strainer bowl 12.

The strainer handle 20 is fixedly attached or rigidly coupled to the strainer basket 30 via a strainer pin 52 at the recess 32. The strainer handle 20 includes the strainer aperture 54 centrally disposed thereof, which is configured to be a hex shape. The length of the strainer handle 20 can be designated as "$L_1$." The length $L_1$ of the strainer handle 20 can be equal to the diameter of the strainer basket 30. Thus, the distal end 21 of the strainer handle 20 can rest on the outer periphery 35 of the strainer basket 30.

The strainer handle 20 further includes an extending clip portion 33 (or flap or tab 33) that is configured to be received within the recess 32 of the strainer basket 30. The extending clip portion 33 fixedly or rigidly couples the strainer handle 20 to the strainer basket 30. Thus, the strainer handle 20 is integrated with the strainer basket 30.

Additionally, the chopper 28 can be centrally positioned or centrally disposed within the strainer basket 30. The chopper includes a chopper rod 22 with chopper blades 24 extending therefrom. The chopper blades 24 can be horizontally offset from each other by a distance $x_1$. One skilled in the art can contemplate any number of chopper blades extending from the chopper rod 22. The proximal end 27 of the chopper rod 22 includes a hex opening 26. The hex opening 26 of the chopper 28 is vertically aligned with the strainer aperture 54 of the strainer handle 20.

Figure 6:
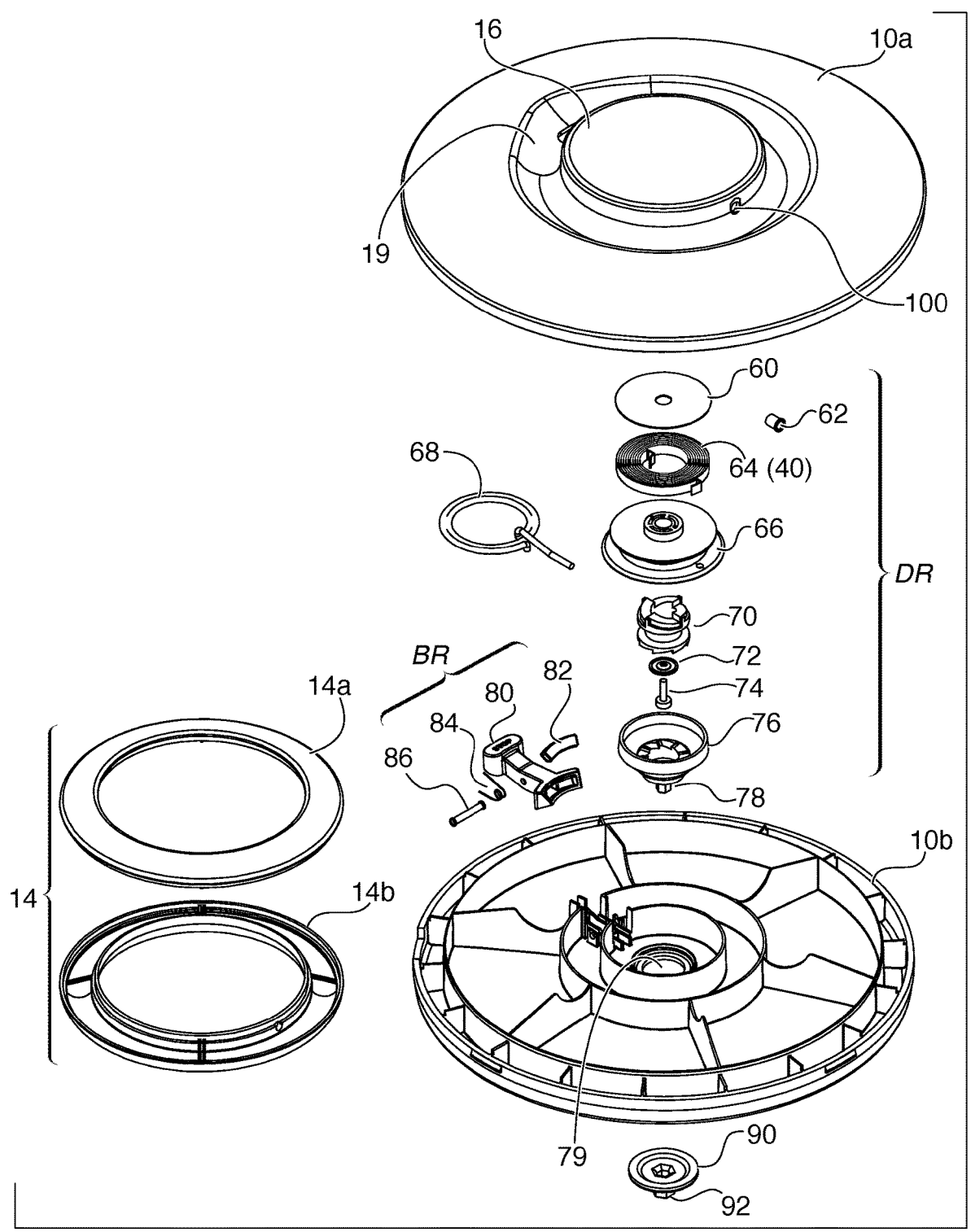
FIG. 6 illustrates an exploded perspective view of the lid of the salad spinner, in accordance with an embodiment of the present invention.

FIG. 6 illustrates an exploded perspective view of the lid of the salad spinner, in accordance with an embodiment of the present invention.

The lid 10 of the salad spinner 5 includes a top lid portion 10A and a bottom lid portion 10B. The top lid portion 10A illustrates the circumferential recess 19 for receiving the ring 14 and further defines the central region 16.

The lid 10 can also include a brake button 100 that actuates the brake system "BR." The brake button 100 can be disposed on a periphery of the central region 16. The brake button 100 is concealed by the ring 14 when the ring 14 rests within the circumferential recess or groove 19. The brake button 100 is thus exposed when the ring 14 is in a flipped state (FIG. 3). The brake system "BR" is incorporated within the lid 10 such that the brake system "BR" is set or arranged or located within an inner area defined by the pull ring 14. Stated differently, the brake system "BR" rests within a space defining a diameter of the ring 14.

Directly underneath the central region 16 are several components configured to allow the ring 14 to be manipulated by the lever arm 40.

The drive mechanism "DR" can include a coil spring shield 60, a pull cord grommet 62, a coil spring 64 (or lever arm 40), a rope spool 66, as well as a pull cord 68. The coil spring 64 is wrapped around the rope spool 66 to enable angular displacement of the lever arm 40 when the ring 14 is pulled. The coil spring shield 60 is positioned over the coil spring 64 to protect the coil spring 64 (or lever arm 40). The drive mechanism "DR" further includes a first drive component 70, a capture ring 72, a drive screw 74, and a second drive component 76. The first drive component 70 cooperates with the second drive component 76 via the drive screw 74 and capture ring 72. The distal end 78 of the second drive component 76 is configured to be received through the opening 79 of the bottom lid portion 10B and into the aperture of the hex drive 90 includes a hex drive shaft 92.

The hex drive shaft 92 is configured to couple to the strainer handle 20 via strainer aperture 54. Thus, the hex drive shaft 92 is configured to be vertically aligned with the strainer aperture 54 of the strainer handle 20 once the lid 10 is placed over the strainer bowl 12.

A brake system "BR" cooperates with the drive system "DR" to facilitate stopping of the spinning of the strainer basket 30. Thus, the brake system "BR" is configured to stop the strainer basket 30 from spinning by imparting a frictional force to the drive mechanism "DR." The brake system "BR" includes a brake 80, a brake pad 82, a brake spring 84, and a brake pin 86. The brake system "BR" can be concealed within the lid 10. In particular, the brake system "BR" can be concealed within the central region 16 of the lid 10.

The ring 14 is also shown in an exploded view illustrating the top ring portion 14A and the bottom ring portion 14B. As noted above, the ring 14 is supported within the circumferential recess or grove or depression 19 of the top lid portion 10A.

Figure 7:
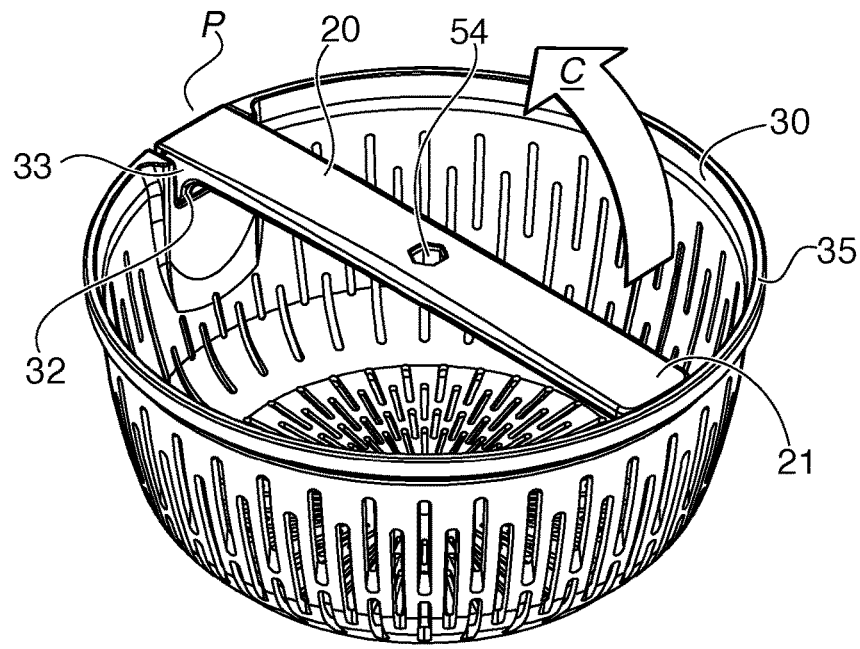
FIG. 7 illustrates the strainer handle in a first configuration within the confines of the strainer bowl, in accordance with an embodiment of the present invention.

FIG. 7 illustrates the strainer handle in a first configuration within the confines of the strainer bowl, in accordance with an embodiment of the present invention.

In a first configuration, the strainer handle 20 is shown in a closed state. That is, the strainer handle 20 extends over the strainer basket 30 such that the distal end 21 rests on the outer periphery 35 of the strainer basket 30. The strainer aperture 54 is centrally disposed on the strainer handle 20. The strainer aperture 54 is configured to be vertically aligned with the hex drive shaft 92 of the lid 10. Thus, when the lid 10 is placed over the strainer basket 30, the hex drive shaft 92 is received within the strainer aperture 54. The strainer handle 20 pivots about point "P" where a recess 32 receives the extending clip portion 33. The strainer handle 20 can pivot in a direction "C."

Figure 8:
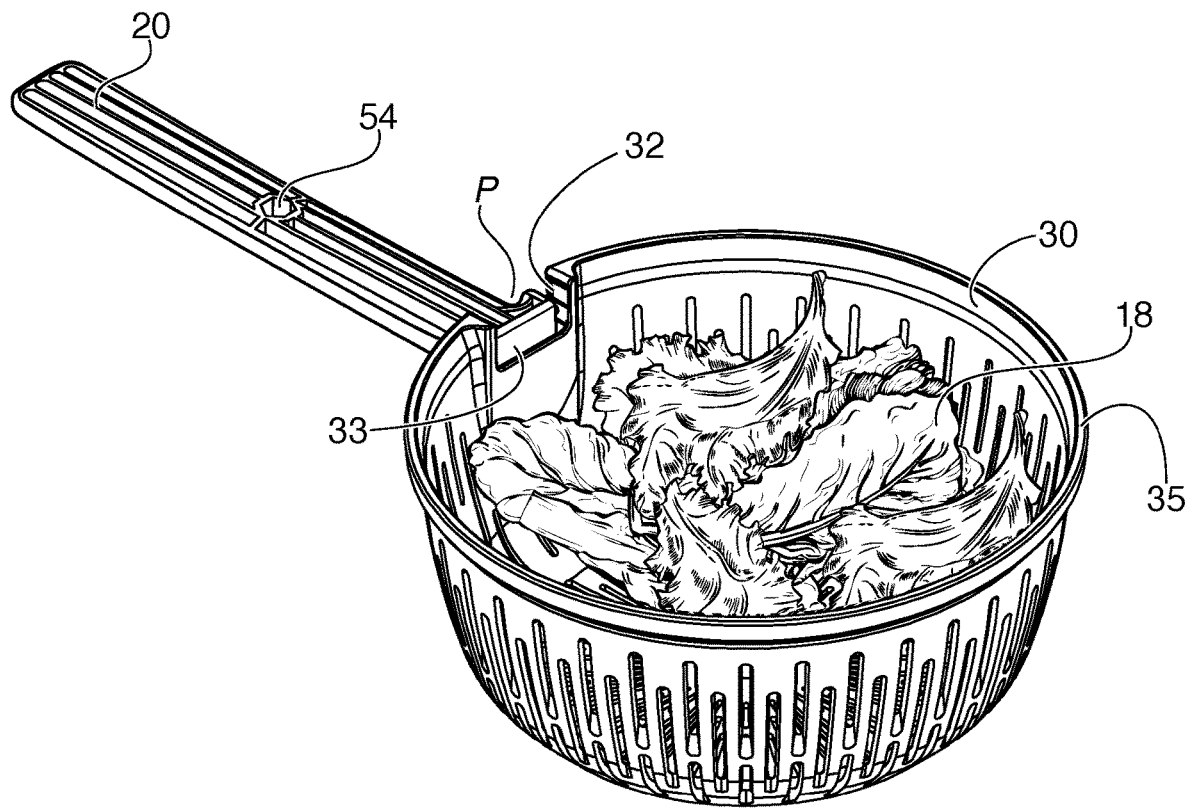
FIG. 8 illustrates the strainer handle in a second configuration outside the strainer bowl, in accordance with an embodiment of the present invention.

FIG. 8 illustrates the strainer handle in a second configuration outside the strainer bowl, in accordance with an embodiment of the present invention.

In the second configuration, the strainer handle 20 is shown in an open state. That is, the strainer handle 20 has been flipped to extend outside the peripheral rim 35 of the strainer basket 30. In the open state, the salad contents 18 are exposed.

In operation, the user attaches the lid 10 to the strainer bowl 12. The strainer bowl 12 includes therein the strainer basket 30 with the foldable or flappable or pivotable strainer handle 20. At this phase, the chopper 28 is not inserted into the strainer basket 30. Instead, the chopper 28 is removed from the strainer basket 30. The hex drive shaft 92 of the lid 10 is vertically aligned with the hex aperture 54 of the strainer handle 20. The spinning motion of the strainer basket 30 is initiated or triggered or originated from a center drive hex nut associated with the lid 10. The user flips the ring 14 from the circumferential recess or groove 19 and pulls of the ring 14 at an angle with respect to the lid 10. The pulling of the ring 14 away from the lid 10 imparts a rotational motion to the strainer basket 30 which includes some type of food content. One pull can result in multiple rotations of the strainer basket 30. The spinning of the strainer basket 30 facilitates in the water droplet removal from the food content via the slits 34 of the strainer basket 30. Thus, in this phase, the user dries the food content in the strainer basket 30. Thus, only one action takes place.

In operation, subsequent to drying the contents of the strainer basket 30, the user may wish to cut a food product. To cut a food product, the user first inserts the food product in the strainer bowl 12 (not the strainer basket 30). The user then positions the chopper 28 within the strainer bowl 12. The lid 10 is then placed over the strainer bowl 12. The hex drive shaft 92 of the lid 10 is vertically aligned with the hex opening 26 of the chopper rod 22 of the chopper 28. The spinning motion of the chopper 28 is initiated or triggered or originated from a center drive hex nut associated with the lid 10. Once again, the user flips the ring 14 from the circumferential recess or groove 19 and pulls of the ring 14 at an angle with respect to the lid 10. The pulling of the ring 14 away from the lid 10 imparts a cutting motion to cut the food content. In particular, the pulling of the ring 14 results in the rotation of the chopper 28 to activate the chopper blades 24. The chopper blades 24 rotate to cut the food content. In this instance, the ring 14 can be pulled multiple times to enable several rotations of the chopper 28 until desired chop consistency is obtained. The lid 10 can then be opened to access the cut or dissected food content.

In summary, the washing of foods is becoming increasingly important for a number of reasons. Increased food trade with countries with relaxed food production standards increasingly utilize improper techniques. Contamination can result from materials which remain on the food such as pesticides, herbicides, fertilizers, as well as common dirt and dust. Even so called "organically grown" foods may contain undesired particles or materials.

To attempt to wash food, techniques employed range from running water over the food, to soaking the food to dipping the food in water containing a mild oxidizing or reducing agent, or a mild soap, in the hope that the agent can come into contact with the organic contaminant and either render it harmless, or facilitate the removal of unwanted organics. However, where chemicals oxidizing or reducing agents are left in contact with the food, they can cause flavor diminution. Leaving the food in contact with the purifying agent, or simply leaving the food in contact with water for a long time can cause water (and agent) absorption and change the firmness and other aspects of the food.

Thus, what is needed is a washing device which is safe, convenient, and efficient. The needed safety, convenience, and efficiency characteristics will encourage food to be washed more often, and will encourage consumers to consume healthier foods.

The exemplary embodiments of the present invention alleviate such issues by introducing a hand-operated salad spinner with dual-action capability. The salad spinner can independently dry food contents and chop food contents. As a result, the hand-operated salad spinner is a combination food spinner and food chopper. The spinning motion of the chopper and the strainer basket are both initiated or triggered or originated from a center drive hex nut (hex drive shaft) associated with the lid. The spinning motion is activated or triggered or actuated from a ring supported within a recess or groove or depression on a top surface of the lid. The ring is flipped up and then pulled in an angular or diagonal direction. The pulling of the ring in an angular or diagonal direction actuates rotational motion of either the chopper or the strainer basket.

While the embodiment described herein is intended as an exemplary salad spinner for drying food articles, it will be appreciated by those skilled in the art that the present invention is not limited for drying food articles, and may be employed for drying other household items.

While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, parameters, thresholds, and other elements used herein are provided as examples, and can be given a different name or label. The use of the term "or" is not limited to exclusive "or" but can also mean "and/or".

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

The invention claimed is:
1. A salad spinner comprising:
a lid having a pull ring supported thereon and a drive shaft extending centrally from a bottom portion thereof; and
a strainer bowl having a strainer basket supported therein, the strainer basket having a pivotable strainer handle mounted on an edge of the strainer basket,
wherein the pull ring is configured to be angularly displaced away from the lid to impart a spinning motion to the strainer basket within the strainer bowl, the spinning motion initiated by the drive shaft.
2. The salad spinner of claim 1, wherein the strainer handle further compromises a centrally disposed aperture having a geometric shape.
3. The salad spinner of claim 2, wherein the drive shaft is removably coupled to the aperture of the strainer handle to impart rotation to the strainer basket.

4. The salad spinner of claim 2, further comprising a chopper centrally placed within the strainer basket and aligned with the chopper including a chopper rod and chopper blades extending outwardly from the chopper rod, a proximal end of the chopper rod having a predefined shape corresponding to geometric shape of the aperture.

5. The salad spinner of claim 4, wherein the drive shaft is removably coupled to the aperture of the strainer basket handle.

6. The salad spinner of claim 1, wherein a brake system is incorporated within the lid such that the brake system is arranged within an inner area defined by the pull ring.

7. The salad spinner of claim 1, wherein a brake system is incorporated within the lid such that the brake system includes a brake button concealed by the pull ring.

8. A salad spinner comprising:
a lid having a drive and
a strainer bowl having a strainer basket placed therein, the strainer basket having a pivotable strainer handle extending a diameter of the strainer basket and having a centrally disposed aperture configured to receive the drive shaft.

9. The salad spinner of claim 8, wherein the lid further includes a pull ring mounted thereon.

10. The salad spinner of claim 9, wherein the pull ring is configured to be angularly displaced away from the lid to impart a spinning motion to the strainer basket within the strainer bowl.

11. The salad spinner of claim 10, wherein the spinning motion is initiated by the drive shaft.

12. The salad spinner of claim 8, wherein the chopper includes a chopper rod with chopper blades extending outwardly therefrom, a proximal end of the chopper rod having a shape configured to match the aperture of the handle.

13. The salad spinner of claim 12, wherein the drive shaft is removably coupled to the proximal end of the chopper through the aperture of the strainer basket handle.

14. The salad spinner of claim 8, wherein a brake system is incorporated within the lid such that the brake system includes a brake button concealed by a pull ring mounted on the lid.

15. A salad spinner comprising:
a lid having a drive shaft extending centrally from a bottom portion thereof; and
a strainer bowl having a strainer basket supported therein, the strainer basket having a foldable strainer handle extending across a diameter of the strainer basket, wherein spinning motion of the strainer basket is initiated by the drive shaft engaging the strainer handle.

16. The salad spinner of claim 15, wherein the lid has a pull ring supported thereon, the pull ring configured to be angularly displaced away from the lid to impart the spinning motion to the strainer basket within the strainer bowl via the strainer handle.

17. The salad spinner of claim 15, wherein the strainer handle defines a centrally disposed strainer aperture having a geometric shape, the drive shaft being removably coupled to the strainer aperture of the strainer handle.

18. The salad spinner of claim 15, wherein the strainer handle is mounted to an opening of a chopper such that the drive shaft is removably coupled to the opening of the chopper.

* * * * *